United States Patent
Kajitani

(10) Patent No.: US 6,494,229 B2
(45) Date of Patent: Dec. 17, 2002

(54) PILOT-TYPE TWO-PORT VACUUM VALVE

(75) Inventor: Masao Kajitani, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/946,328

(22) Filed: Sep. 6, 2001

(65) Prior Publication Data

US 2002/0033461 A1 Mar. 21, 2002

(30) Foreign Application Priority Data

Sep. 18, 2000 (JP) ........................................ 2000-281715

(51) Int. Cl.[7] ............................................. F16K 31/363
(52) U.S. Cl. ................... 137/530; 251/63.6; 251/335.3; 251/122
(58) Field of Search ................................. 137/530, 529, 137/528; 257/63.6, 63.5, 335.3, 337

(56) References Cited

U.S. PATENT DOCUMENTS

| | | | | |
|---|---|---|---|---|
| 1,919,232 A | * | 7/1933 | Lee | 251/122 |
| 4,431,159 A | * | 2/1984 | Stubbs | 251/63.6 |
| 5,172,722 A | * | 12/1992 | Nishimura | 137/630 |
| 5,174,335 A | * | 12/1992 | Iwabuchi | 137/625.3 |
| 5,634,627 A | * | 6/1997 | Daido et al. | 251/63.6 |
| 5,678,595 A | * | 10/1997 | Iwabuchi | 251/335.3 |
| 5,848,608 A | * | 12/1998 | Ishigaki | 137/630 |

* cited by examiner

*Primary Examiner*—Henry C. Yuen
*Assistant Examiner*—John Bastianelli
(74) *Attorney, Agent, or Firm*—Oblon, Spivak, McClelland, Maier & Neustadt, P.C.

(57) ABSTRACT

In a vacuum valve including a main flow path and an auxiliary flow path for connecting a chamber port and a pump port in parallel, a main valve body for opening and closing a main valve seat in the main flow path, and an auxiliary valve body for opening and closing an auxiliary valve seat in the auxiliary flow path, the main valve body includes, in addition to a valve sealing member for opening and closing the main valve seat in a poppet manner, a flow rate adjusting portion in a gradually-tapered shape to be fitted in an inner hole of the main valve seat and the flow rate adjusting portion functions to gradually increase an exhaust flow rate when the main valve body opens after opening of the auxiliary valve body.

7 Claims, 5 Drawing Sheets

PILOT-TYPE TWO-PORT VACUUM VALVE

TECHNICAL FIELD

The present invention relates to a pilot-type two-port vacuum valve connected between a vacuum chamber and a vacuum pump and used for gradually reducing pressure in the vacuum chamber to vacuum pressure.

PRIOR ART

In general, if gas at atmospheric pressure or high pressure in a vacuum chamber is exhausted rapidly in reducing internal pressure of the vacuum chamber to vacuum pressure by a vacuum pump in a manufacturing process and the like of a semiconductor, a large amount of gas flows temporarily. As a result, gas turbulence occurs in the vacuum chamber, a cloud of particles deposited on a vacuum chamber inner wall or the like is raised, and the particles may be deposited on a workpiece or the workpiece moves and a set position of the workpiece may be displaced.

Therefore, a vacuum valve having a main valve body having a large flow path area and an auxiliary valve body having a small flow path area is disposed in a flow path connecting the vacuum chamber and the vacuum pump. As shown in FIG. 7, after carrying out initial exhausting by opening the auxiliary valve body with the small flow path area, the main valve body with the large flow path area is opened to thereby to thereby change a gas inhalation amount in stages.

However, because the flow path area of the main valve body was much greater than that of the auxiliary valve body, it was found that a sudden change in a flow rate occurred and that the gas turbulence was likely to occur in the vacuum chamber even if the main valve body was opened immediately after the auxiliary valve body had been opened to carry out the initial exhausting.

DISCLOSURE OF THE INVENTION

It is an object of the present invention to provide a pilot-type two-port vacuum valve in which a valve opening degree is gradually increased in opening of a main valve body to make change of a flow rate smooth to thereby prevent occurrence of gas turbulence in a vacuum chamber and to stably carry out exhausting.

To achieve the above object, according to the invention, there is provided a pilot-type two-port vacuum valve comprising: a chamber port to be connected to a vacuum chamber and a pump port to be connected to a vacuum pump; a casing including the ports; a main flow path having a large cross-sectional area and an auxiliary flow path having a smaller cross-sectional area than the main flow path for connecting the chamber port and the pump port in parallel; a main valve body for opening and closing a main valve seat in the main flow path and an auxiliary valve body for opening and closing an auxiliary valve seat in the auxiliary flow path; a first piston connected to the main valve body through a first shaft and a second piston connected to the auxiliary valve body through a second shaft; a main pressure operating chamber for applying air pressure in a valve-opening direction to the first piston and an auxiliary pressure operating chamber for applying air pressure in a valve-opening direction to the second piston; and first spring means for repulsing the main valve body in a valve-closing direction and second spring means for repulsing the auxiliary valve body in a valve-closing direction; wherein the main valve body includes a valve sealing member for coming in contact with and separating from the main valve seat to thereby open and close the main valve seat in a poppet manner and a pillar-shaped flow rate adjusting portion to be fitted in an inner hole of the main valve seat to move in the inner hole by opening and closing of the valve sealing member and the flow rate adjusting portion is formed in a gradually-tapered shape to thereby have a function of gradually increasing a flow rate of air flowing through the main flow path in opening of the valve sealing member.

In the vacuum valve of the invention having the above structure, in a case of exhausting gas from the vacuum chamber, after the auxiliary valve body is actuated by air pressure to open the auxiliary valve seat with a small flow path area to thereby carry out initial exhausting, the main valve body is actuated to open the main valve seat with a large flow path area to thereby carry out remaining exhausting, for example. At this time, the main valve body has the gradually-tapered pillar-shaped flow rate adjusting portion and the flow rate adjusting portion functions to gradually increase the flow rate of air flowing through the main flow path in opening of the main valve body. Therefore, generation of turbulence in the vacuum chamber due to rapid exhausting is prevented.

According to a concrete embodiment of the invention, the main valve body includes a locking portion having a larger diameter than the flow rate adjusting portion in a position extending from the flow rate adjusting portion, a stepped portion with and to which the locking portion is to be fitted and locked is formed in the inner hole of the main valve seat, and a valve-closing position of the main valve body is defined by the locking portion and the stepped portion.

The flow rate adjusting portion of the main valve body has a plurality of tapered faces with different gradients successively in an axial direction or is formed of a smooth curved face in a gradually-tapered shape.

According to another concrete embodiment of the invention, the auxiliary flow path and the auxiliary valve body are incorporated in the main valve body, the second piston and the auxiliary pressure operating chamber are incorporated in the first piston, the second shaft is incorporated in the first shaft, the main valve body includes a locking portion having a larger diameter than the flow rate adjusting portion in a position extending from the flow rate adjusting portion, a stepped portion with and to which the locking portion is to be fitted and locked is formed in the inner hole of the main valve seat, and a valve-closing position of the main valve body is defined by the locking portion and the stepped portion.

In this case, the first piston has a connecting hole for connecting the main pressure operating chamber and the auxiliary pressure operating chamber and the casing has one operating port for supplying pressure air to the main pressure operating chamber. It is also possible that the casing has first and second operating ports for individually supplying pressure air to the main pressure operating chamber and the auxiliary pressure operating chamber, that the first operating port communicates with the main pressure operating chamber through a through hole provided to the casing, and that the second operating port communicates with the auxiliary pressure operating chamber through a through hole provided in the casing and the first shaft.

DETAILED DESCRIPTION

Figure 1:
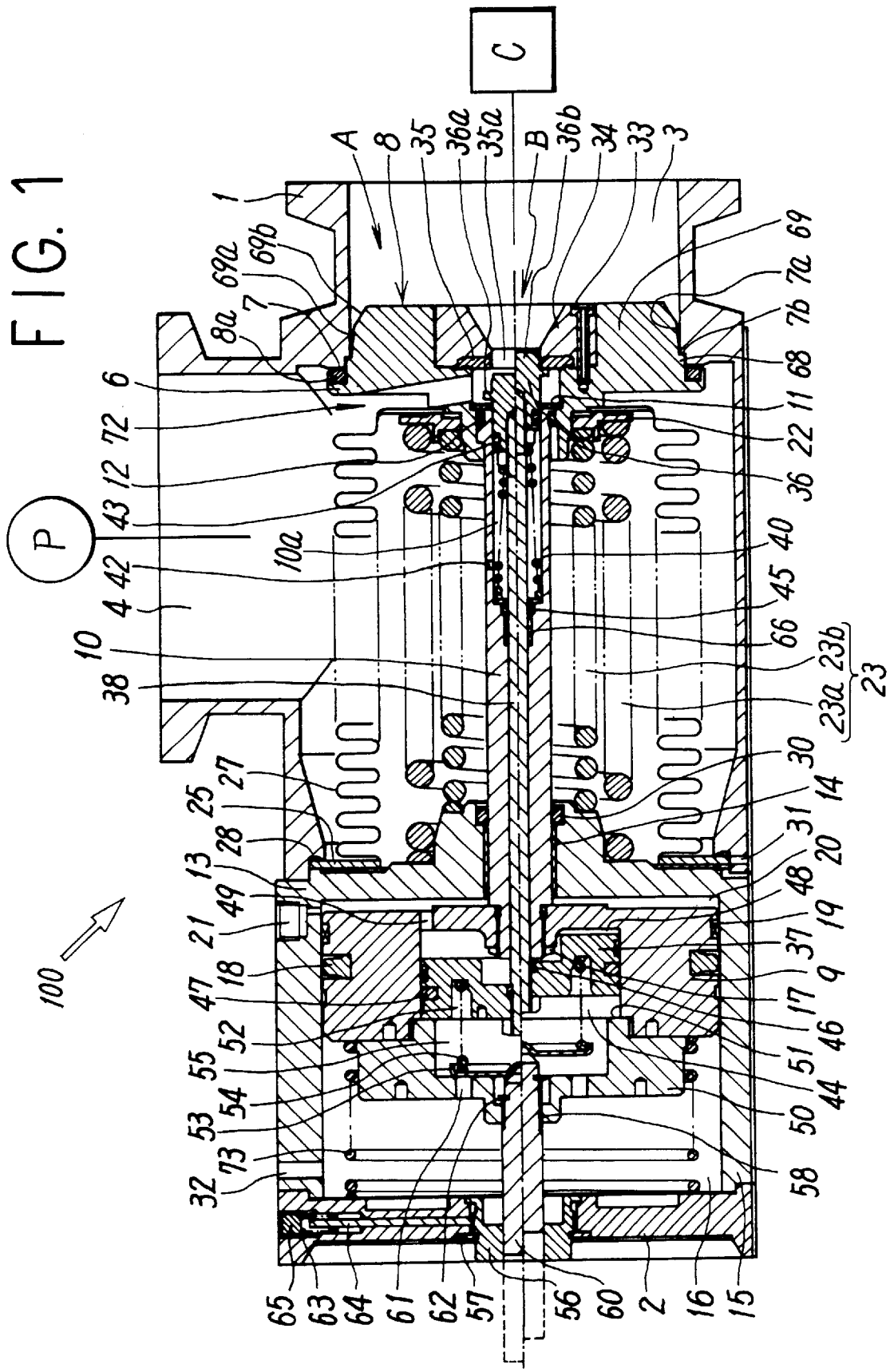
FIG. 1 is a sectional view showing a first embodiment of a vacuum valve of the present invention and respectively showing open and closed states of an auxiliary valve body.

Embodiments of the present invention will be described below in detail based on the drawings. A pilot-type two-port vacuum valve 100 of the first embodiment shown in FIG. 1 has a substantially cylindrical casing 1. An axial rear end portion of the casing 1 is closed with a cover 2, a chamber port 3 to be connected to a vacuum chamber C is formed in a tip end portion of the casing 1, and a pump port 4 to be connected to a vacuum pump P is formed in a side face of the casing 1 in such a direction as to be orthogonal to an axis. In the casing 1, a main flow path A having a large flow path area and an auxiliary flow path B having a small flow path area for connecting the chamber port 3 and the pump port 4 in parallel are provided and a main valve mechanism for opening and closing the main flow path A and an auxiliary valve mechanism for opening and closing the auxiliary flow path B are provided respectively.

The main valve mechanism has a main valve body 8 for opening and closing a main valve seat 7 in the main flow path A, a first piston 9 actuated by operation of air pressure to drive the main valve body RA and a first shaft 10 for connecting the main valve body 8 and the first piston 9 to each other.

The main valve body 8 includes a disc-shaped first valve holder 6 having an open central portion and a ring-shaped valve sealing member 8a mounted to a peripheral edge portion of the first valve holder 6 and opens and closes the main valve seat 7 in a poppet manner by bringing the valve sealing member 8a into contact with and separating the member 8a from the main valve seat 7. The main valve body 8 also includes a locking portion 68 in a short columnar shape to be fitted in an inner hole 7a of the main valve seat 7 and a flow rate adjusting portion 69 integrally with the first valve holder 6. The locking portion 68 positioned on a base end portion side of the first valve holder 6 has a uniform diameter, comes in contact with a stepped portion 7b on an inner periphery of the inner hole 7a in valve closing of the main valve body 8 to thereby define a valve-closing position of the main valve body 8. The flow rate adjusting portion 69 is provided in a position closer to a tip end portion of the main valve body 8 than the locking portion 68 and formed into a gradually-tapered form by having a plurality of tapered faces 69a and 69b with different gradients successively in an axial direction. By moving in the inner hole 7a as the valve sealing member 8a opens, the flow rate adjusting portion 69 functions to gradually increase a flow rate of air flowing through the main flow path A. When the main valve body 8 has moved to an opening stroke end, the flow rate adjusting portion 69 occupies a position where the flow rate adjusting portion 69 has completely got out of the inner hole 7a of the main valve seat 7.

The central opening of the first valve holder 6 forms a part of the auxiliary flow path B and communicates with the pump port 4 through a connecting passage 72 provided to the first valve holder 6. A tip end portion of the first shaft 10 is fitted and locked into the central portion of the first valve holder 6 and fixed by a snap ring 11 so as not to come out. A reference numeral 12 in the drawing designates a sealing member for maintaining airtightness between the first shaft 11 and the first valve holder 6.

A rear end portion of the first shaft 10 passes for sliding and airtightly through a pedestal 13 in the casing 1 through a guide bushing 14 and a sealing member 30, projects into a first piston chamber 16 formed between the pedestal 13, a cylinder 15, and the cover 2, and is airtightly connected by a nut 17 to the first piston 9 disposed for sliding in the first piston chamber 16.

The first piston 9 has on an outer periphery thereof packing 18 and a guide ring 19 in airtight and sliding contact with an inner wall of the first piston chamber 16 and a main pressure operating chamber 20 defined between the first piston 9 and the pedestal 13 communicates with an operating port 21 formed in a side wall of the cylinder 15.

Therefore, if pressure air is supplied from the operating port 21 to the main pressure operating chamber 20, the first piston 9 moves rearward and the main valve body 8 opens. In this case, pressure air with pressure controlled by an electropneumatic regulator is supplied to the operating port 21.

In the casing 1, first spring means 23 formed of two coil springs 23a and 23b for repulsing the main valve body 8 in a closing direction is provided between a spring receiver 22 mounted to the first valve holder 6 and the pedestal 13 and a bellows 27 in which the first shaft 10 and the two springs 23a and 23b are enveloped is provided between a bellows holder 25 sandwiched between the casing 1 and the pedestal 13 and the first valve holder 6. In the drawing, a reference numeral 28 designates a sealing member for maintaining airtightness between the casing 1 and the bellows holder 25. A reference numeral 31 designates a breathing port for connecting inside space of the bellows 27 to an outside and a reference numeral 32 designates a breathing port for connecting a breathing chamber behind the first piston 9 to the outside.

On the other hand, the auxiliary valve mechanism has an auxiliary valve body 36 for opening and closing an auxiliary valve seat 35 in the auxiliary flow path B provided to the main valve body 8, a second piston 37 actuated by operation of air pressure to drive the auxiliary valve body 36, and a second shaft 38 for connecting the auxiliary valve body 36 and the second piston 37 to each other and these respective members are integrally incorporated into the main valve mechanism as can be understood from the following description.

In other words, the auxiliary valve seat 35 is mounted to an annular second valve holder 34 coaxially fixed into a central depression of the first valve holder 6 through a fixing bolt 33. The auxiliary valve body 36 has a flange-shaped valve sealing portion 36a for coming in contact with and separating from the auxiliary valve sea 35 to thereby open and close the auxiliary vale seat 35 in a poppet manner and a flow rate adjusting portion 36b in a shape of a needle valve to be fitted in an inner hole 35a of the auxiliary valve seat 35. The auxiliary valve body 36 is housed for sliding in forward and rearward directions in a hollow portion 10a formed in the tip end portion of the first shaft 10 and is repulsed in a valve-closing direction by third spring means 40 formed of a coil spring. In the drawing, a reference numeral 42 designates a breathing hole for connecting a back chamber of the auxiliary valve body 36 to the outside and a reference numeral 43 designates a sealing member for maintaining airtightness between the first shaft 10 and the auxiliary valve body 36.

The second shaft 38 is inserted airtightly and for sliding into the first shaft 10 and a rear end portion of the second shaft 38 projects into a second piston chamber 44 formed in the first piston 9 and is airtightly connected to the second piston 37 disposed for sliding in the second piston chamber 44. In the drawing, a reference numeral 45 designates a sealing member for maintaining airtightness between the second shaft 38 and the first shaft 10 and a reference numeral 46 designates a sealing member for maintaining airtightness between the second shaft 38 and the second piston 37. A reference numeral 66 designates a bushing disposed between the first shaft 10 and the second shaft 38 to prevent deflection of the second shaft 38.

The second piston 37 has on an outer periphery thereof a sealing member 47 in airtight and sliding contact with an inner wall of the second piston chamber 44, an auxiliary pressure operating chamber 48 is define between the second piston 37 and the first piston 9 on a front face side of the second piston 37, and the auxiliary pressure operating chamber 48 and the main pressure operating chamber 20 communicate with each other through a connecting hole 49 formed in the first piston 9.

The first piston 9 is integrally provided at a rear end portion thereof with a circular-cap-shaped piston cover 50. An inside diameter of the piston cover 50 is formed to be slightly smaller than an inside diameter of the first piston 9. A stopper 51 for defining a stroke end of the second piston 37 is formed of an inside diameter end of the piston cover 50. In a chamber 55 positioned in the piston cover 50 and behind the second piston 37, a saucer-shaped movable spring seat 53 is disposed for moving forward and rearward with respect to the second piston 37. Second spring means 54 formed of a coil spring is provided between the spring seat 53 and an annular depression 52 in a back face of the second piston 37 and the second piston 37 is repulsed by the second spring means 54 in such a direction as to close the auxiliary valve body 36. Therefore, the auxiliary valve body 36 is repulsed by both the second spring means 54 and the third spring means 40 in a valve closing direction in this embodiment. However, the third spring means 40 may be omitted in some instances.

In the first piston chamber 16, fourth spring means 73 for repulsing the first piston 9 in a valve-closing direction is provided. This fourth spring means 73 is for reinforcing a valve-closing force of the first spring means 23 for the main valve body 8 to thereby make change of a valve opening degree with respect to operating pressure mild to reduce the change of the flow rate but is not necessarily provided.

A screw hole 58 is formed in a central portion of a top face of the piston cover 50 and an adjusting rod 60 is screwed down into the screw hole 58 such that the adjusting rod 60 can move forward and rearward by rotation. A tip end portion of the adjusting rod 60 extends into the 10 chamber 55 to be in contact with the movable spring seat 53 and an opposite base end portion of the adjusting rod 60 passes through a central portion of the cover 2 and extends outside the casing 1. A dial 56 having a knurled outer periphery is incorporated in the central portion of the cover 2 such that the dial 56 can be operated in a turning manner from outside the casing 1 and that the dial 56 is prevented from coming off by a snap ring 57. The adjusting rod 60 passes through the dial 56. There is such a relationship between the dial 56 and the adjusting rod 60 that they are movable with respect to each other in an axial direction and are connected to each other in a rotating direction. If the dial 56 is turned to operate the adjusting rod 60 in a rotating manner, the adjusting rod 60 moves forward or rearward and the movable spring seat 53 moves forward/rearward. As a result, a compressed amount of the second spring means changes and a repulsing force of the second spring means is adjusted.

In the drawing, a reference numeral 61 designates a breathing hole for connecting the breathing chamber 55 behind the second piston 37 to a breathing chamber behind the first piston 9 and a reference numeral 62 designates a snap ring for preventing coming off of the adjusting rod 60 from the piston cover 50.

A needle 64 for preventing spontaneous rotation of the dial 56 is mounted to the cover 2. The needle 64 is inserted into a hole formed in the cover 2 and a tip end of the needle 64 is pushed against the knurled outer periphery of the dial 56 by a spring 63 disposed between the needle 64 and a setscrew 65.

In order to connect the adjusting rod 60 and the dial 56 only in the rotating direction as described above, the adjusting rod 60 and the dial 56 may be formed into a shaft and a hole in shapes of a square, a rectangle, a hexagon, or the like, formed into a round shaft and a circular hole with parts of side faces thereof flattened, or formed into a shaft and a hole in proper sectional shapes respectively having a groove and a projection engaged with each other in the rotating direction only, for example. However, other proper connecting mechanisms may be also used.

There is such relationships between diameters of the first piston 9 and the second piston 37 and between repulsing forces of the spring means for repulsing the pistons of the main valve mechanism and the auxiliary valve mechanism that the second piston 37 is actuated by lower air pressure than the first piston 9.

In the exhaust valve 100 having the above structure, in a non-operating state, the main valve body 8 is, by the repulsing forces of the first spring means 23 and the fourth spring means 73, and the auxiliary valve body 36 is, by the repulsing forces of the second spring means 54 and the third spring means 40, moved to closed positions of the valves such that the valve bodies come in contact with the main valve seat 7 and the auxiliary valve seat 35 to thereby respectively close the main flow path A and the auxiliary flow path B. Therefore, if the vacuum pump P is operated in this state, gas in the vacuum chamber C is not discharged from the chamber port 3 into the pump port 4.

If pressure air with pressure controlled by the electropneumatic regulator (not shown) is supplied from the operating port 21 to the main pressure operating chamber 20, the pressure air is also flows into the auxiliary pressure operating chamber 48 through the connecting hole 49.

Then, if an air pressure operating force applied to the second piston 37 in the auxiliary pressure operating chamber 48 exceeds the repulsing forces of the second spring means 54 and the third spring means 40, the second piston 37 is actuated to open the auxiliary valve body 36 to a set opening degree through the second shaft 38. As a result, gas in the vacuum chamber C gradually flows into the pump port 4 through the auxiliary flow path B which is open to a restricted degree and the vacuum chamber C is slowly exhausted of gas.

At this time, gas turbulence generated in a case of rapid exhausting is not generated in the vacuum chamber C and a cloud of particles is not raised by the turbulence. Overload due to temporary inhalation of a large amount of air by the vacuum pump P does not occur.

Then, if the air pressure in the main pressure operating chamber 20 increases and if an air pressure operating force applied to the first piston 9 exceeds the repulsing forces of the first spring means 23 and the fourth spring means 73, the first piston 9 is actuated to move the first shaft 10 rearward to a position where the first shaft 10 comes in contact with the cover 2 against the repulsing forces of the first spring means 23 and the fourth spring means 73 and to open the main valve body 8. As a result, the main flow path A with the large cross-sectional area opens and remaining exhausting is carried out. At this time, the flow rate adjusting portion 69 formed in the main valve body 8 moves in the inner hole 7a in the main valve seat 7 as the valve sealing member 8a opens the main valve seat 7 and functions to gradually increase the flow rate of air flowing through the main flow path A with the gradually-tapered shape of the flow rate adjusting portion 69. Therefore, generation of turbulence in the vacuum chamber C due to rapid exhausting is prevented.

Vacuum pressure in the vacuum chamber C is detected by a sensor provided to the chamber port 3, to a piping portion connecting the chamber port 3 and the vacuum chamber C, or in the vacuum chamber C. In order to maintain or change the vacuum pressure in the vacuum chamber C at or to a set pressure, output pressure of the electropneumatic regulator is adjusted automatically.

If air pressure from the operating port 21 is reduced after a necessary degree of vacuum of the vacuum chamber C is obtained, the main valve body 8 first closes the main flow path A when the air pressure operating force applied to the first piston 9 becomes smaller than the repulsing forces of the first spring means 23 and the fourth spring means 73 and the auxiliary valve body 36 then closes the auxiliary flow path B when the air pressure operating force applied to the second piston 37 becomes smaller than the repulsing forces of the second spring means 54 and the third spring means 40.

Figure 2:
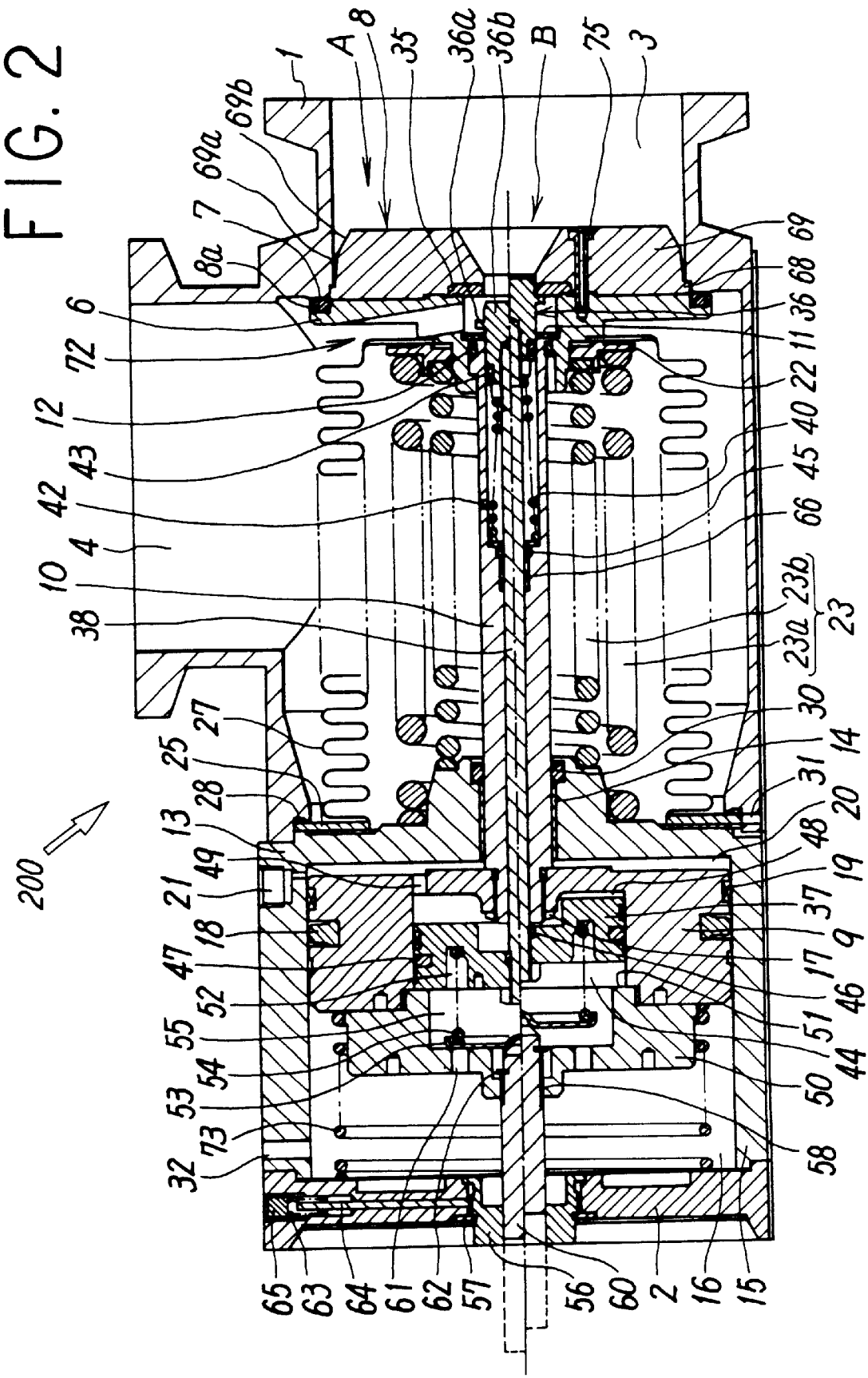
FIG. 2 is a sectional view showing a second embodiment of the vacuum valve of the invention and respectively showing open and closed states of an auxiliary valve body.

FIG. 2 shows a second embodiment of the vacuum valve.

This vacuum valve 200 of the second embodiment is different from the vacuum valve 100 of the first embodiment in that the locking portion 68 and the flow rate adjusting portion 69 are formed separately from the first valve holder 6 and are mounted on the first valve holder 6 by a fixed volt 75 in the vacuum valve 200 while the locking portion 68 and the flow rate adjusting portion 69 are formed integrally with the first valve holder 6 in the vacuum valve 100. The locking portion 68 and the flow rate adjusting portion 69 are formed integrally with each other and the auxiliary valve seat 35 is mounted to the locking portion 68 and the flow rate adjusting portion 69. Therefore, the locking portion 68 and the flow rate adjusting portion 69 also function as the second valve holder for holding the auxiliary valve seat 35.

Because structures of the second embodiment other than those described above are substantially similar to those of the first embodiment, the main similar components are provided with similar reference numerals to omit description of the components.

Figure 3:
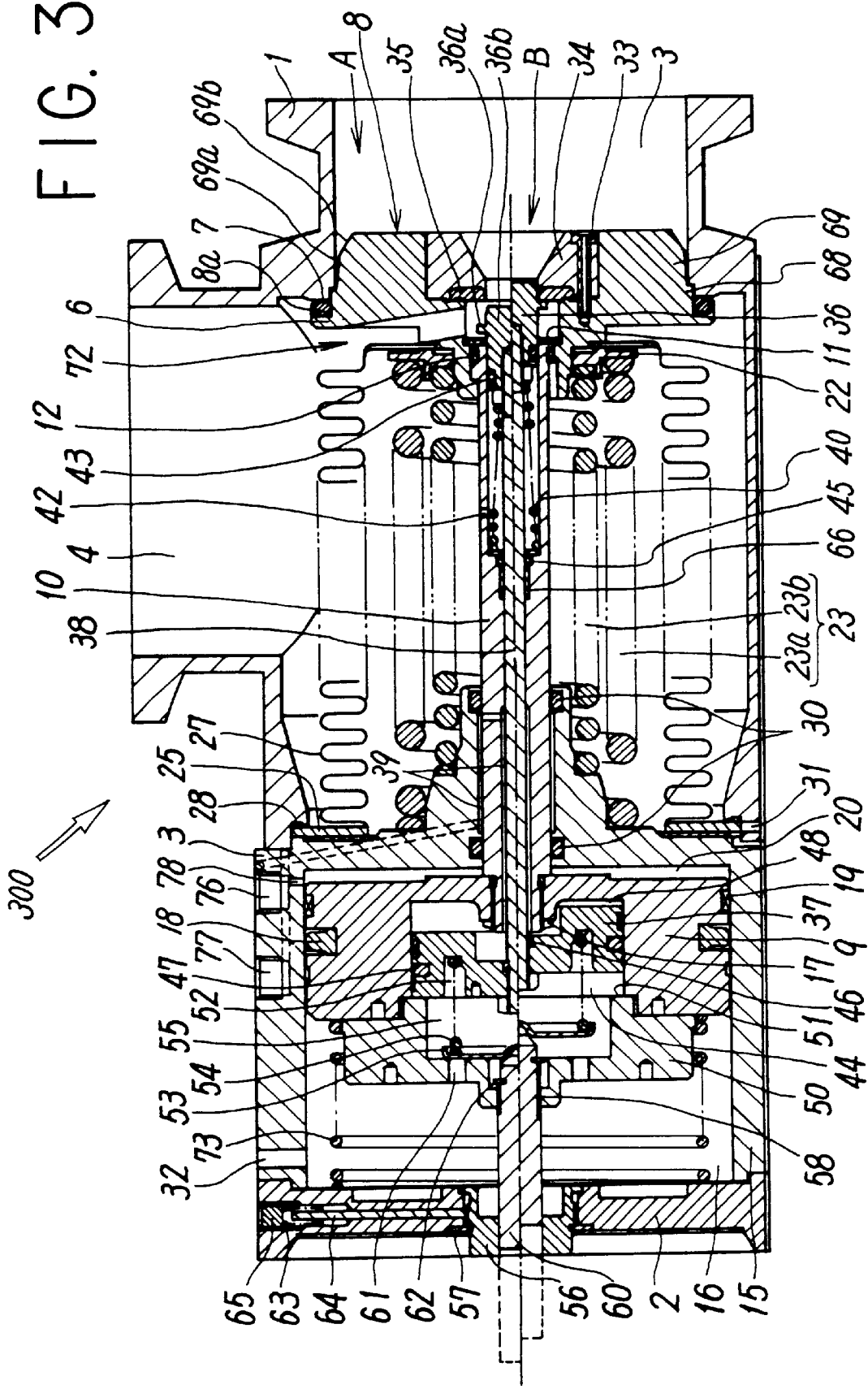
FIG. 3 is a sectional view showing a third embodiment of the vacuum valve of the invention and respectively showing open and closed states of an auxiliary valve body.

FIG. 3 shows a third embodiment of the vacuum valve. This vacuum valve 300 of the third embodiment is different from the vacuum valve 100 of the first embodiment in that pressure air is individually supplied to the main pressure operating chamber 20 and the auxiliary pressure operating chamber 48 from a first operating port 76 and a second operating port 77 in the vacuum valve 300 of the third embodiment while the main pressure operating chamber 20 and the auxiliary pressure operating chamber 48 communicate with each other through the connecting hole 49 formed in the first piston 9 and pressure air is supplied from the one common operating port 21 to the main pressure operating chamber 20 and the auxiliary pressure operating chamber 48 in the vacuum valve 100. In other words, the first operating port 76 and the second operating port 77 are formed on the side face of the cylinder 15 in the casing 1, the first operating port 76 communicates with the main pressure operating chamber 20 through a through hole 78 provided to the cylinder 15, and the second operating port 77 communicates with the auxiliary pressure operating chamber 48 though a through hole 79 provided in the cylinder 15 and the first shaft 10. Therefore, the main pressure operating chamber 20 and the auxiliary pressure operating chamber 48 do not communicate with each other.

Therefore, in this vacuum valve 300, moving amounts of the first piston 9 and the second piston 37 are adjusted by individually changing air pressure supplied from the first operating port 76 and the second operating port 77 to thereby individually adjust valve-opening amounts of the main valve body 8 and the auxiliary valve body 36, i.e., flow rates. It is also possible to adjust a small flow rate by the auxiliary valve body 36 while allowing air of a predetermined flow rate to flow by opening the main valve body 8 by a necessary amount.

Because structures of the third embodiment other than those described above are substantially similar to those of the first embodiment, the main similar components are provided with similar reference numerals to omit description of the components. In the third embodiment, similarly to the second embodiment, it is also possible that the locking portion 68 and the flow rate adjusting portion 69 are formed separately from the first valve holder 6 and also function as the second valve holder 34.

Figure 4:
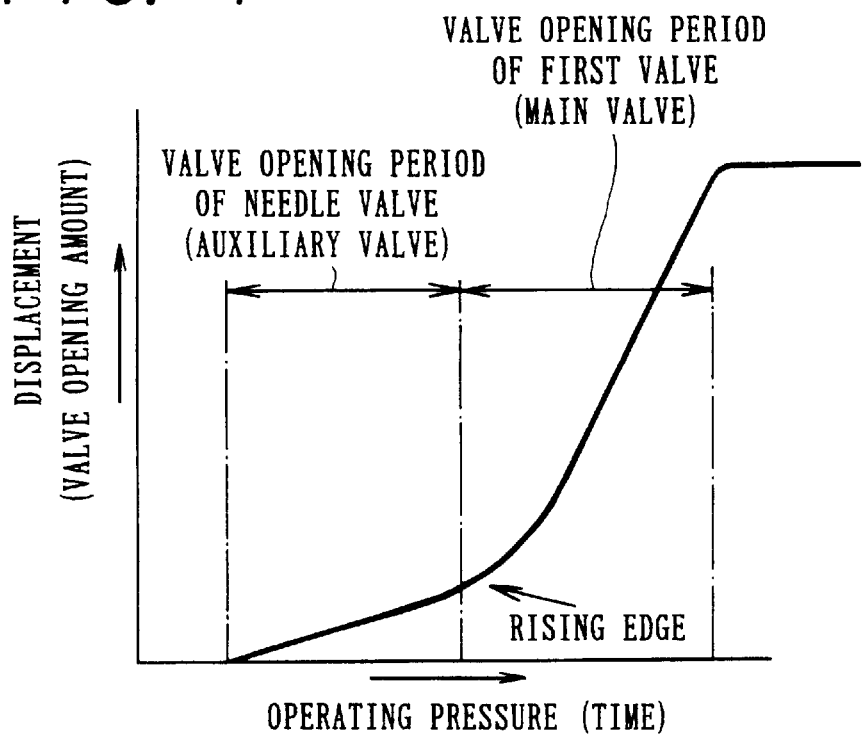
FIG. 4 is an operating pressure-exhaust flow rate plot of the vacuum valve of the invention.
Figure 7:
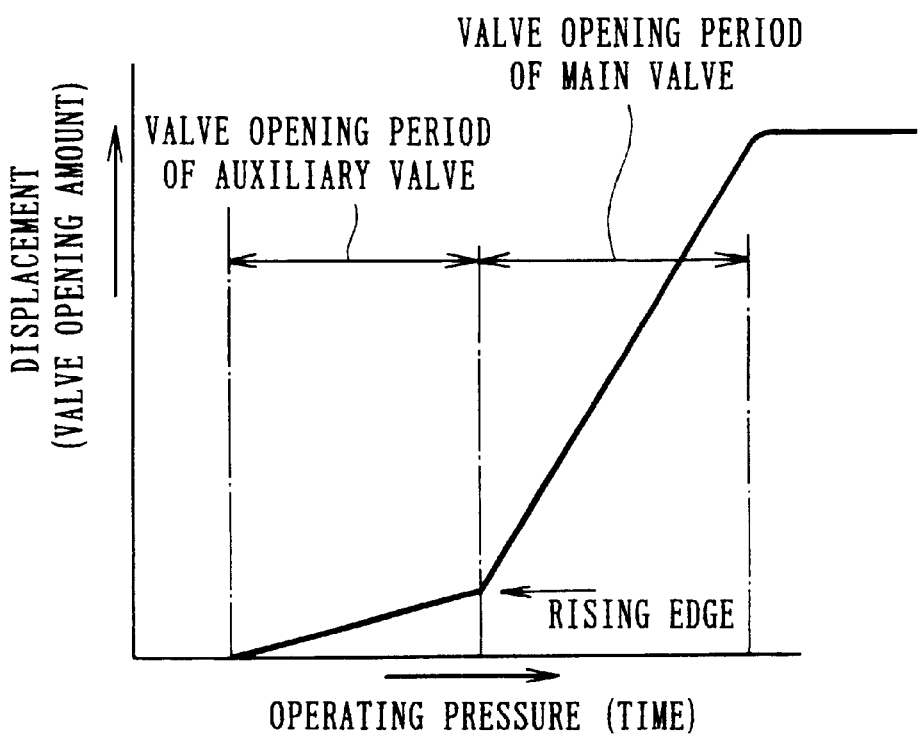
FIG. 7 is an operating pressure-exhaust flow rate plot of a prior-art vacuum valve.

FIG. 4 shows an exhaust flow rate characteristic of the vacuum valve of each the above embodiment. Because the flow rate adjusting portion 69 functions to gradually increase an exhaust flow rate when the main valve body 8 opens after opening of the auxiliary valve body 36, it is found that the exhaust flow rate changes smoothly and mildly as compared with prior art shown in FIG. 7 and that the vacuum chamber C is mildly exhausted of gas. As a result, gas turbulence in the vacuum chamber C is reliably prevented and raising of a cloud of particles due to the turbulence can be reliably prevented.

Figure 5:
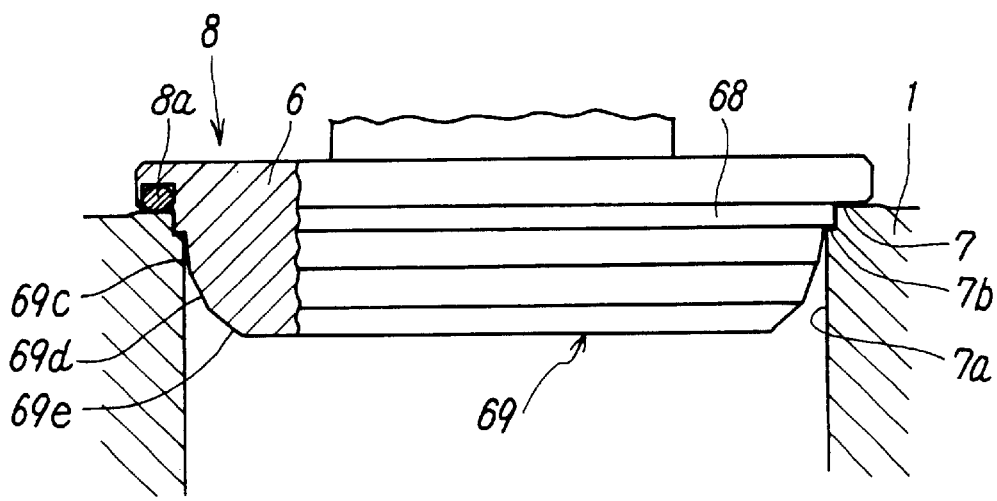
FIG. 5 is a sectional view of an essential portion of another example of a structure of a main valve body in the vacuum valve of the invention.
Figure 6:
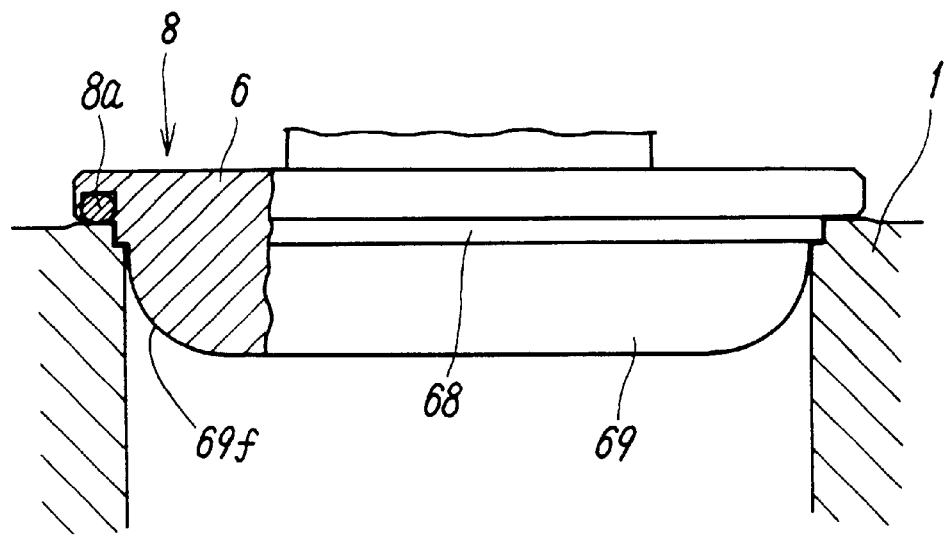
FIG. 6 is a sectional view of an essential portion of yet another example of the structure of the main valve body in the vacuum valve of the invention.

The pilot-type two-port vacuum valve of the invention is not limited to the above embodiments but various modifications in design can be made without departing from the spirit of the invention defined in claims. For example, as shown in FIG. 5, the flow rate adjusting portion 69 of the main valve body 8 may include successive three tapered faces 69c, 69d, and 69e or may include four or more tapered faces. As shown in FIG. 6, the flow rate adjusting portion 69 may be formed into a tapered shape formed of a smooth curved face 69f instead of the above-described tapered faces.

As described above, according to the invention, by forming the flow rate adjusting portion in the gradually-tapered shape in the main valve body, the flow rate adjusting portion functions to gradually increase the exhaust flow rate when the main valve body opens after opening of the auxiliary valve body. Therefore, the exhaust flow rate changes smoothly and mildly and the vacuum chamber is mildly exhausted of gas. As a result, gas turbulence in the vacuum chamber is reliably prevented and raising of a cloud of particles is reliably prevented.

What is claimed is:

1. A pilot-type two-port vacuum valve comprising:

a chamber port to be connected to a vacuum chamber and a pump port to be connected to a vacuum pump; a casing including said ports; a main flow path having a large cross-sectional area and an auxiliary flow path having a smaller cross-sectional area than said main flow path for connecting said chamber port and said pump port in parallel; a main valve body for opening and closing a main valve seat in said main flow path and an auxiliary valve body for opening and closing an auxiliary valve seat in said auxiliary flow path; a first piston connected to said main valve body through a first shaft and a second piston connected to said auxiliary valve body through a second shaft; a main pressure operating chamber for applying air pressure in a valve-opening direction to said first piston and an auxiliary pressure operating chamber for applying air pressure in a valve-opening direction to said second piston; and first spring means for repulsing said main valve body in a valve-closing direction and second spring means for repulsing said auxiliary valve body in a valve-closing direction, wherein said main valve body includes a valve sealing member for coming in contact with and separating from said main valve seat to thereby open and close said main valve seat in a poppet manner and a pillar-shaped flow rate adjusting portion to be fitted in an inner hole of said main valve seat to move in said inner hole by opening and closing of said valve sealing member and said flow rate adjusting portion is formed in a gradually-tapered shape to thereby have a function of gradually increasing a flow rate of air flowing through said main flow path in opening of said valve sealing member.

2. A vacuum valve according to claim 1, wherein said main valve body includes a locking portion having a larger diameter than said flow rate adjusting portion in a position extending from said flow rate adjusting portion, a stepped portion with and to which said locking portion is to be fitted and locked is formed in said inner hole of said main valve seat, and a valve-closing position of said main valve body is defined by said locking portion and said stepped portion.

3. A vacuum valve according to claim 1, wherein said flow rate adjusting portion of said main valve body has a plurality of tapered faces with different gradients successively in an axial direction.

4. A vacuum valve according to claim 1, wherein said flow rate adjusting portion of said main valve body is formed of a smooth curved face in a gradually-tapered shape.

5. A vacuum valve according to claim 1, wherein said auxiliary flow path and said auxiliary valve body are incorporated in said main valve body, said second piston and said auxiliary pressure operating chamber are incorporated in said first piston, said second shaft is incorporated in said first shaft, said main valve body includes a locking portion having a larger diameter than said flow rate adjusting portion in a position extending from said flow rate adjusting portion, a stepped portion with and to which said locking portion is to be fitted and locked is formed in said inner hole of said main valve seat, and a valve-closing position of said main valve body is defined by said locking portion and said stepped portion.

6. A vacuum valve according to claim 5, wherein said first piston has a connecting hole for connecting said main pressure operating chamber and said auxiliary pressure operating chamber and said casing has one operating port for supplying pressure air to said main pressure operating chamber.

7. A vacuum valve according to claim 5, wherein said casing has first and second operating ports for individually supplying pressure air to said main pressure operating chamber and said auxiliary pressure operating chamber, said first operating port communicates with said main pressure operating chamber through a through hole provided to said casing, and said second operating port communicates with said auxiliary pressure operating chamber through a through hole provided in said casing and said first shaft.

* * * * *